Aug. 11, 1931.    A. J. FARMER    1,818,314

MEASURING VALVE FOR LUBRICATING SYSTEMS

Filed Oct. 15, 1928

Inventor

Albert J. Farmer

By

Attorneys

Patented Aug. 11, 1931

1,818,314

UNITED STATES PATENT OFFICE

ALBERT J. FARMER, OF DETROIT, MICHIGAN

MEASURING VALVE FOR LUBRICATING SYSTEMS

Application filed October 15, 1928. Serial No. 312,581.

This invention relates to a valve for use in connection with lubricating systems wherein pressure is employed to force the lubricant through the system and into the bearing or bearings to be lubricated, the valves embodying the present invention being preferably located in the system, one adjacent each bearing, to control the flow of oil thereto and deliver measured quantities to the bearing.

An object of the present invention is to simplify construction and lessen the cost of manufacture by providing a construction wherein the device is made up of a plurality of parts which may be separately manufactured with facility and so arranged that no great accuracy in the machining operation is required. A further object is to provide independently operating valve members arranged to be moved to open position by lubricant pressure and to be closed by separate springs, said members being successively pressure operated to control the inlet of lubricant to a measuring chamber and the discharge of measured quantities from said chamber, and then operating to positively close the outlet from the chamber. A further object is to provide an arrangement whereby a single valvular member operates to control the inlet to a measuring chamber and is operable to positively close the outlet therefrom, a separate member being provided to hold the outlet from the chamber closed until a desired pressure has been built up in the chamber, when said outlet control member will open to discharge a measured quantity of lubricant in advance of the positive closing of the outlet by the other member. It is also an object to provide an outlet control member so constructed that movement thereof under pressure in the measuring chamber, is permitted without opening the outlet, thus permitting of the building up of a higher pressure in said chamber prior to the discharge of lubricant therefrom.

Other objects attained by the present construction and arrangement as hereinafter more fully set forth, will presently appear and the present invention consists in such matters more particularly pointed out in the appended claim, reference being had to the accompanying drawings, in which—

Figure 1:
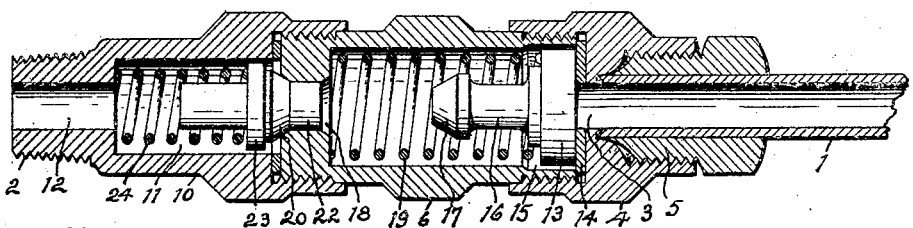
Figure 2:
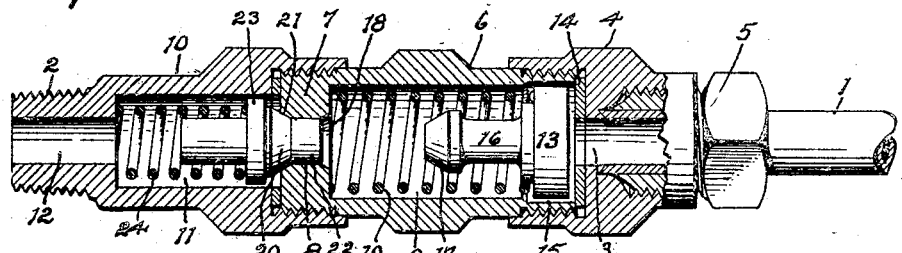
Figure 3:
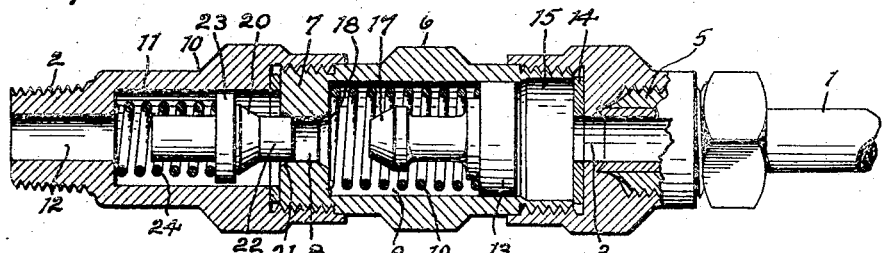
Figure 4:
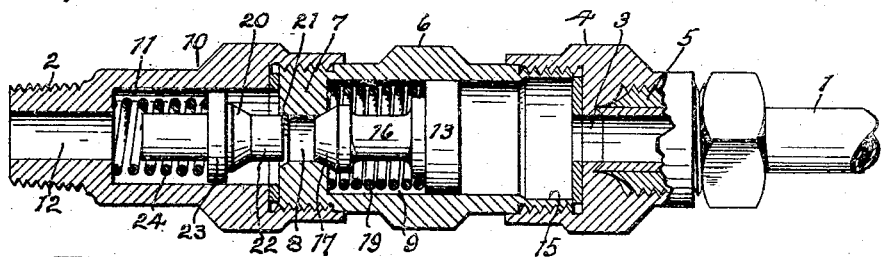

Figure 1 is an enlarged longitudinal axial section through a valve structure illustrative of an embodiment of the present invention and showing valvular control members in side elevation and in normal position; and Figs. 2, 3 and 4 are similar sections showing these valvular control members in the successive positions to which they are moved by lubricant pressure, in the operation of the device.

The device illustrated is adapted to be connected in a lubricating system by connecting one end of the device to a tube 1 forming one of the lines of the system leading to a bearing (not shown) or other part to be lubricated, the opposite end of the device being provided with an externally screwthreaded end 2 adapted to be screwed into an opening in the member or part to be lubricated. Lubricant is forced through the tube 1 by any suitable means (not shown) and passes through a bore 3 forming the inlet of the valve, which bore is formed in a suitable fitting 4 to which the tube 1 is secured by means of what is commonly known as a Dole fitting 5. The end of the fitting 4 opposite that to which the tube 1 is attached, is bored out and internally screwthreaded to receive the externally screwthreaded end of a tubular body 6, said body being formed with a bore extending inwardly from the inlet end to a short distance from the opposite end, thus forming an end wall 7 which is bored axially of the body, forming an outlet passage 8 for the bore of the body, which bore forms a measuring chamber 9.

The end of the body 6 having the outlet 8, is externally screwthreaded to screw into a nipple fitting 10 having the screwthreaded end 2, and this fitting is bored inwardly from the end thereof connected to the body, to form a spring chamber 11 into which the passage 8 opens and from which a discharge passage 12 leads axially through the end portion 2.

To control the inlet 3 to the chamber 9, a valvular member 13 in the form of a piston is fitted in the bore of the body to reciprocate therein and to seat against a suitable seat member 14 secured in the end of the bore and thus securely close the inlet. The end of the bore of the body 6 is enlarged or increased in diameter for a short distance inwardly, this portion 15 of the bore being of greater diameter than the diameter of the piston 13, thus providing a space around the piston for the passage of lubricant from the inlet when the piston has left its seat and before it has entered the main bore within which it fits tightly.

On the piston or member 13 is a longitudinally projecting stem 16 formed integral with the piston and projecting into the chamber 9, and the free end of this stem is tapered or conical in form to provide a tapered valve member 17 adapted to seat within a seat 18 therefor formed by tapering the entrance to the passage 8. A coiled spring 19 in the chamber 9 is interposed between the wall 7 and piston 13, and exerts a force tending to hold said piston seated upon its seat 14 over the inlet 3.

In the chamber 11 of the fitting 10, is a valvular member formed with a truncated conical valve portion 20 to seat in a seat 21 therefor formed by tapering the end of the passage 8 and said member is also formed with a cylindrical portion 22 extending from the conical portion to fit closely within the bore 8. An annular rib 23 formed at the base of the cone 20 serves as a seat for a coiled spring 24 which is seated at its opposite end on the end wall of the chamber 11, and this spring exerts a force to normally hold the conical part 20 seated in its seat with the cylindrical valve part 22 engaged within the outlet passage 8. The rib 23 is of considerably less diameter than the diameter of the chamber 11 so that lubricant flowing into the chamber from the passage 8 may pass freely past said valve member and out through the outlet 12 to the part to be lubricated.

In operation, the valvular members are normally held by their springs with the inlet to the chamber 9 closed by the member 13 and the outlet from said chamber closed by the member 20, as shown in Fig. 1, there not being sufficient lubricant pressure in the line 1 to move the member 13 from its seat. Upon increase in lubricant pressure sufficient to move said piston valve from its seat over the inlet 3, as shown in Fig. 2, lubricant will find its way past said piston due to the enlarged diameter of the end portion 15 of the chamber, and lubricant will flow into the chamber until the pressure in the chamber equals the line pressure but will not escape from the chamber due to the outlet passage therefrom being closed by the valve 20.

Upon further increase in line pressure, the piston valve will be moved into the smaller bore of the chamber as shown in Fig. 3 within which smaller bore said piston fits closely, and communication between inlet and chamber ahead of the piston will be closed and this will increase the pressure on the piston and cause it to move further against the action of the spring 19. This advance of the piston in the chamber 9 may increase the pressure ahead of the piston sufficiently to start to move the valve 20, but this valve will not be immediately opened due to the distance which it must move against the action of its spring 24 in order to disengage the cylindrical valve part 22 from the bore 8. A pressure is therefore built up in the chamber 9 as the farther the valve 20 must move, the greater will be the force exerted by the spring. Therefore when sufficient pressure has been built up in the measuring chamber to fully open the valve, it will open suddenly and oil will be ejected with great force, and as such pressure in the measuring chamber is lowered by the release of lubricant upon opening of the discharge valve, the piston will quickly move, bringing its conical valve 17 to its seat as shown in Fig. 4 and positively closing the chamber outlet. Thereafter any desired pressure may be built up in the line without further discharge, and should the conduit to some other bearing or part which is being lubricated by the system be clogged, sufficient pressure may be put on the system to force the obstruction from the particular line leading to that particular clogged bearing or part.

As the piston valve 13 is unconnected with the discharge valve, no great accuracy of alignment is necessary in order to have the valve members seat perfectly, particularly as these valve members in a measure are both free to find their seats. Therefore the cost of producing a valve of this construction is reduced and as the body 6 is formed separately from the fittings 4 and 10, all may be produced at a low cost.

As each valvular member is controlled by a separate spring, the operation of each member may be regulated to suit the particular conditions of installation by substituting springs of a different strength, and such change may be conveniently made due to the construction of the several members forming the casing.

Obviously, changes in the particular construction shown may be made within the scope of the appended claim without departing from the spirit of the invention, and I do not, therefore, limit myself to the form and arrangement shown.

Having thus fully described my invention, what I claim is:—

A valve for connection in a pressure lubricating system including a body formed with a measuring chamber having an inlet at one end and a wall at its opposite end formed with an outlet passage, a piston valve in said chamber normally closing the inlet and arranged to permit the passage of lubricant under pressure past said piston during a portion only of the forward movement of said piston, means carried by said piston to close said outlet at the end of the forward stroke of the piston, a spring to impart a return movement to the piston, a separate valvular member normally closing said outlet and moved by lubricant pressure in said chamber to open said outlet, and a spring normally holding said member seated, said valvular member and said piston valve being independently movable, one by direct line pressure and the other by lubricant pressure in said chamber created by movement of said piston and wherein said valvular member is provided with a cylindrical portion to enter and fill said outlet passage and of extended length to provide for extended movement of said member in opening said outlet.

In testimony whereof I affix my signature.

ALBERT J. FARMER.